(12) United States Patent
Chen

(10) Patent No.: US 9,798,195 B2
(45) Date of Patent: Oct. 24, 2017

(54) DISPLAY

(71) Applicant: Au Optronics Corporation, Hsinchu (TW)

(72) Inventor: Yan-Liang Chen, Yilan County (TW)

(73) Assignee: Au Optronics Corporation, Hsinchu (TW)

( * ) Notice: Subject to any disclaimer, the term of this patent is extended or adjusted under 35 U.S.C. 154(b) by 21 days.

(21) Appl. No.: 14/943,031

(22) Filed: Nov. 17, 2015

(65) Prior Publication Data

US 2017/0031195 A1 Feb. 2, 2017

(30) Foreign Application Priority Data

Jul. 28, 2015 (TW) .............................. 104124442 A

(51) Int. Cl.
| | | |
|---|---|---|
| *H01L 31/036* | (2006.01) | |
| *H01L 27/14* | (2006.01) | |
| *H01L 29/04* | (2006.01) | |
| *G02F 1/1339* | (2006.01) | |
| *G02F 1/1335* | (2006.01) | |

(52) U.S. Cl.
CPC .... *G02F 1/13394* (2013.01); *G02F 1/133512* (2013.01); *G02F 2001/13396* (2013.01); *G02F 2001/13398* (2013.01)

(58) Field of Classification Search
CPC .................................................. H01L 27/3276
USPC ........................................................... 257/72
See application file for complete search history.

(56) References Cited

U.S. PATENT DOCUMENTS

| | | | |
|---|---|---|---|
| 7,295,277 B2 | 11/2007 | Mori et al. | |
| 7,352,429 B2 | 4/2008 | Tseng et al. | |
| 7,548,299 B2 | 6/2009 | Tseng et al. | |
| 9,442,327 B2* | 9/2016 | Kim | ..................... G02F 1/13394 |
| 2005/0052607 A1 | 3/2005 | Mori et al. | |
| 2005/0275328 A1 | 12/2005 | Tseng et al. | |
| 2007/0153192 A1* | 7/2007 | Huang | .............. G02F 1/133707 |
| | | | 349/139 |

(Continued)

FOREIGN PATENT DOCUMENTS

| | | |
|---|---|---|
| CN | 103676340 | 3/2014 |
| JP | 2010107698 A * | 5/2010 |

(Continued)

OTHER PUBLICATIONS

"Office Action of Taiwan Counterpart Application", dated Nov. 10, 2016, p. 1-p. 6.

*Primary Examiner* — Matthew Landau
*Assistant Examiner* — Igwe U Anya
(74) *Attorney, Agent, or Firm* — JCIPRNET

(57) ABSTRACT

A display device that includes a first substrate, a plurality of scan lines, a plurality of data lines, a plurality of pixel structures, a passivation layer, a bump, a second substrate, and a spacer is provided. The scan lines, the data lines, the pixel structures, and the passivation layer are all located on the first substrate. The bump is arranged on the first substrate. The second substrate is arranged opposite to the first substrate. The spacer is arranged on the second substrate and at least partially overlapped with the bump. One of the bump and the spacer has a first shape and the other has a second shape. Each of lengths of two end sections of the first shape in a first direction is larger than a length of a middle section of the first shape in the first direction.

17 Claims, 18 Drawing Sheets

(56) References Cited

U.S. PATENT DOCUMENTS

| | | | |
|---|---|---|---|
| 2008/0198317 A1 | 8/2008 | Tseng et al. | |
| 2009/0058826 A1* | 3/2009 | Lee | G06F 3/0412 345/173 |
| 2009/0323007 A1* | 12/2009 | Shim | G02F 1/13394 349/155 |
| 2010/0103364 A1* | 4/2010 | Choi | G02F 1/13394 349/157 |
| 2010/0134731 A1* | 6/2010 | Jeon | G02F 1/13624 349/110 |
| 2011/0001723 A1* | 1/2011 | Fan | G06F 3/0412 345/174 |
| 2013/0076687 A1* | 3/2013 | Giddings | G06F 3/0414 345/174 |
| 2013/0235294 A1 | 9/2013 | Nomura | |
| 2013/0329150 A1 | 12/2013 | Kim et al. | |
| 2013/0342781 A1* | 12/2013 | Lee | G02F 1/1368 349/46 |
| 2014/0168538 A1* | 6/2014 | Kim | G06F 3/044 349/12 |
| 2014/0354924 A1* | 12/2014 | Byun | G02F 1/133514 349/106 |
| 2015/0028343 A1* | 1/2015 | Li | H01L 27/124 257/72 |
| 2015/0277199 A1* | 10/2015 | Chang | G02F 1/136286 349/12 |
| 2015/0346533 A1* | 12/2015 | Park | G02F 1/13394 349/42 |
| 2016/0077369 A1* | 3/2016 | Kim | G02F 1/13394 349/43 |
| 2016/0202526 A1* | 7/2016 | Shim | G02F 1/13394 257/72 |
| 2016/0282654 A1 | 9/2016 | Fu | |

FOREIGN PATENT DOCUMENTS

| | | |
|---|---|---|
| TW | 200521548 | 7/2005 |
| TW | 200540500 | 12/2005 |

* cited by examiner

DISPLAY

CROSS-REFERENCE TO RELATED APPLICATION

This application claims the priority benefit of Taiwan application serial no. 104124442, filed on Jul. 28, 2015. The entirety of the above-mentioned patent application is hereby incorporated by reference herein and made a part of this specification.

FIELD OF DISCLOSURE

The disclosure relates to a display. More particularly, the disclosure relates to a display having a spacer or a bump with certain shape.

DESCRIPTION OF RELATED ART

With the advancement of science and technology, bulky cathode ray tube (CRT) displays have gradually fallen into disuse. At present, liquid crystal displays (LCDs), organic light emitting diode (OLED) displays, electro-phoretic displays (EPDs), and plasma display panels (PDPs) have little by little become the mainstream displays in the next generation.

In order to accurately maintain a cell gap between an active device array substrate and an opposite substrate in a display panel, a spacer is often inserted between the active device array substrate and the opposite substrate to support the gap. In general, if a display panel is bent or pressed (e.g., if a moving PS test is performed), the spacer may be misaligned (or may slide), and the misaligned spacer is likely to scratch the film layers on the active device array substrate in a display area or lessen alignment effects of an alignment layer on the active device array substrate, which may result in the phenomenon of dark-state light leakage of the display panel. Moreover, if the spacer is misaligned in an oblique direction, the spacer may asymmetrically scratch two adjacent pixel areas, such that the issue of dark-state light leakage becomes more salient. Hence, how to improve the tolerance for misalignment of the spacer in the display panel has become one of the research topics in the pertinent field.

SUMMARY

The disclosure is directed to a display capable of improving the tolerance for misalignment of a spacer and resolving the issue of dark-state light leakage of the display.

In an embodiment of the disclosure, a display is provided. The display includes a first substrate, a plurality of scan lines, a plurality of data lines, a plurality of pixel structures, a passivation layer, a bump, a second substrate, and a spacer. The scan lines, the data lines, the pixel structures, and the passivation layer are all located on the first substrate. The bump is arranged on the first substrate. The second substrate is arranged opposite to the first substrate. The spacer is arranged on the second substrate and at least partially overlapped with the bump. One of the bump and the spacer has a first shape and the other has a second shape. Each of lengths of two end sections of the first shape in a first direction is larger than a length of a middle section of the first shape in the first direction.

In view of the above, one of the bump and the spacer has the special shape of which the two end sections each have the length greater than the length of the middle section. When the spacer is misaligned in an oblique direction, owing to the special shape, the contact area between the spacer and the bump can be increased, the cell gap can be maintained, the spacer can be prevented from scratching the display area, and further the tolerance for misalignment of the spacer can be enhanced. As such, the issue of dark-state light leakage caused by the misalignment of the spacer in the display can be resolved.

Several exemplary embodiments accompanied with figures are describe in detail below to further describe the disclosure in details.

DETAILED DESCRIPTION OF DISCLOSED EMBODIMENTS

Figure 1:
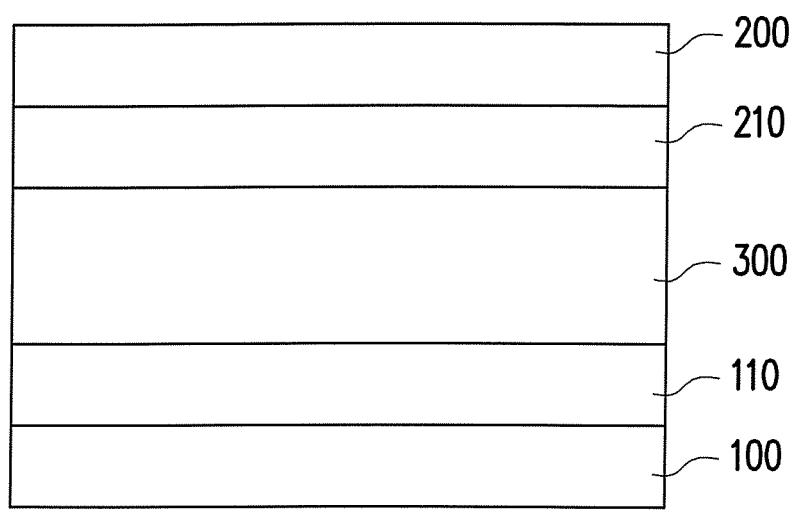
FIG. 1 is a schematic cross-sectional view illustrating a display according to an embodiment of the disclosure.
Figure 2A:
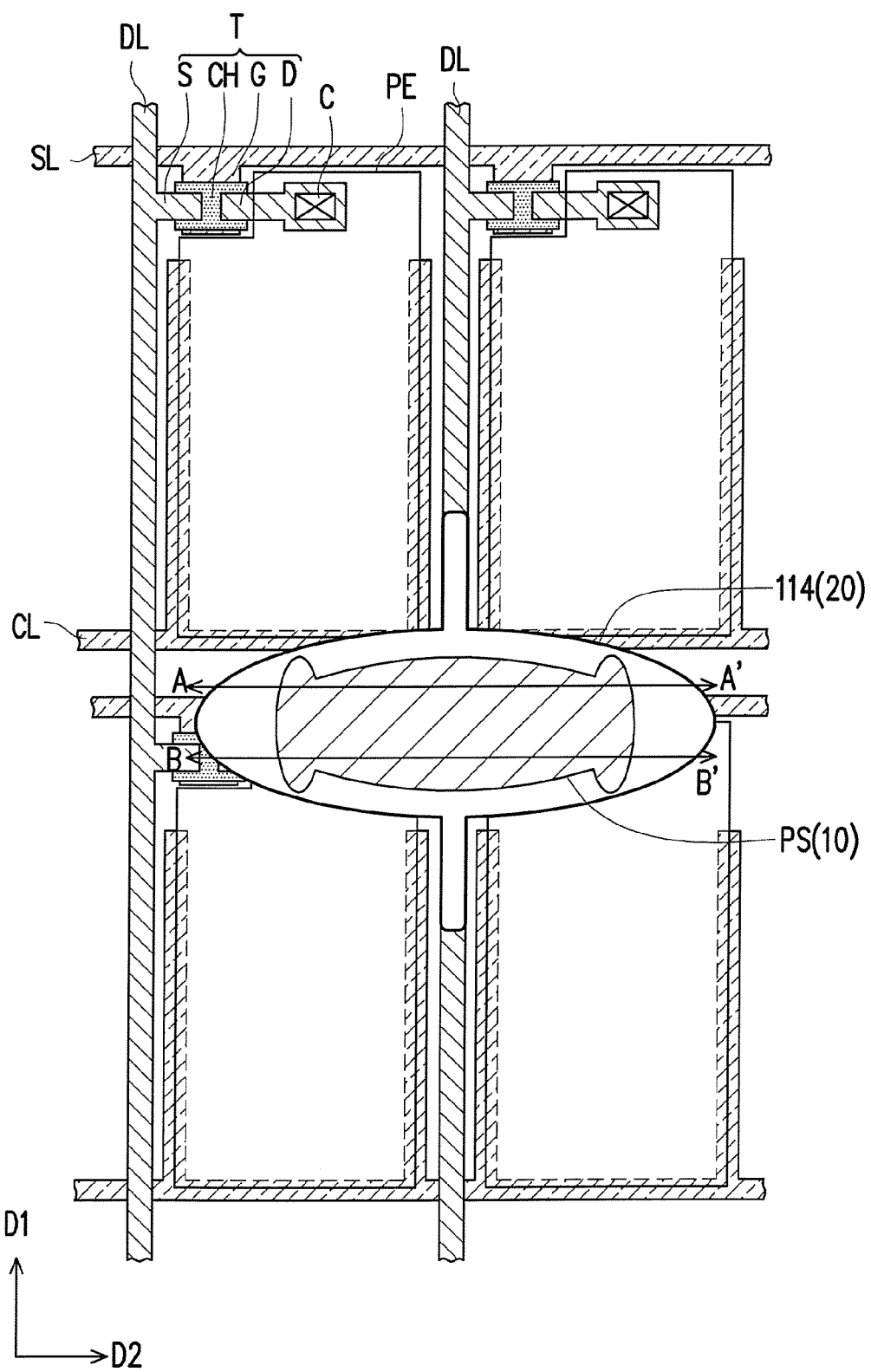
FIG. 2A and FIG. 2B are schematic top views illustrating a display according to an embodiment of the disclosure, and FIG. 2A does not illustrate any black matrix.
Figure 2B:
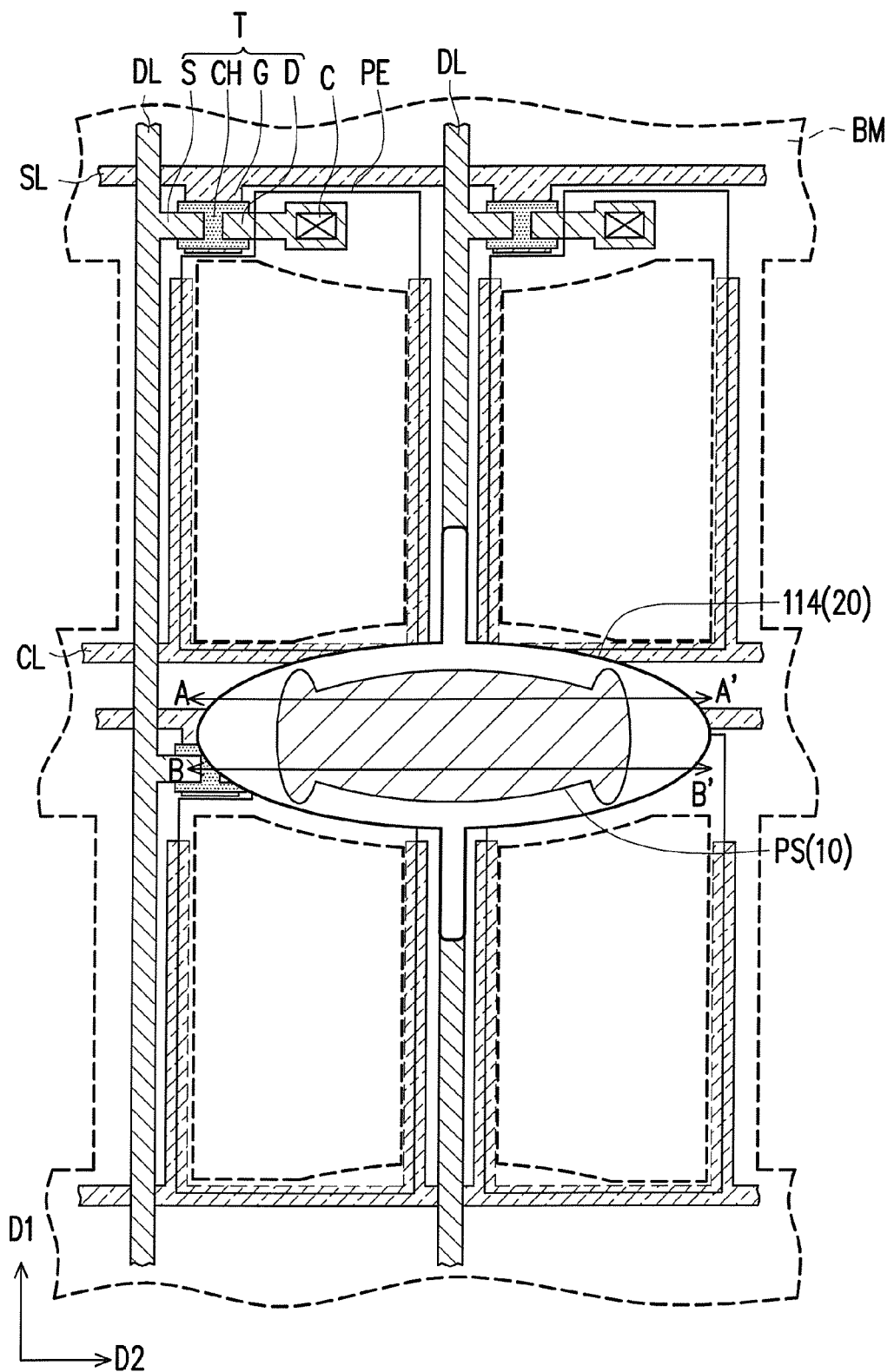
Figure 3A:
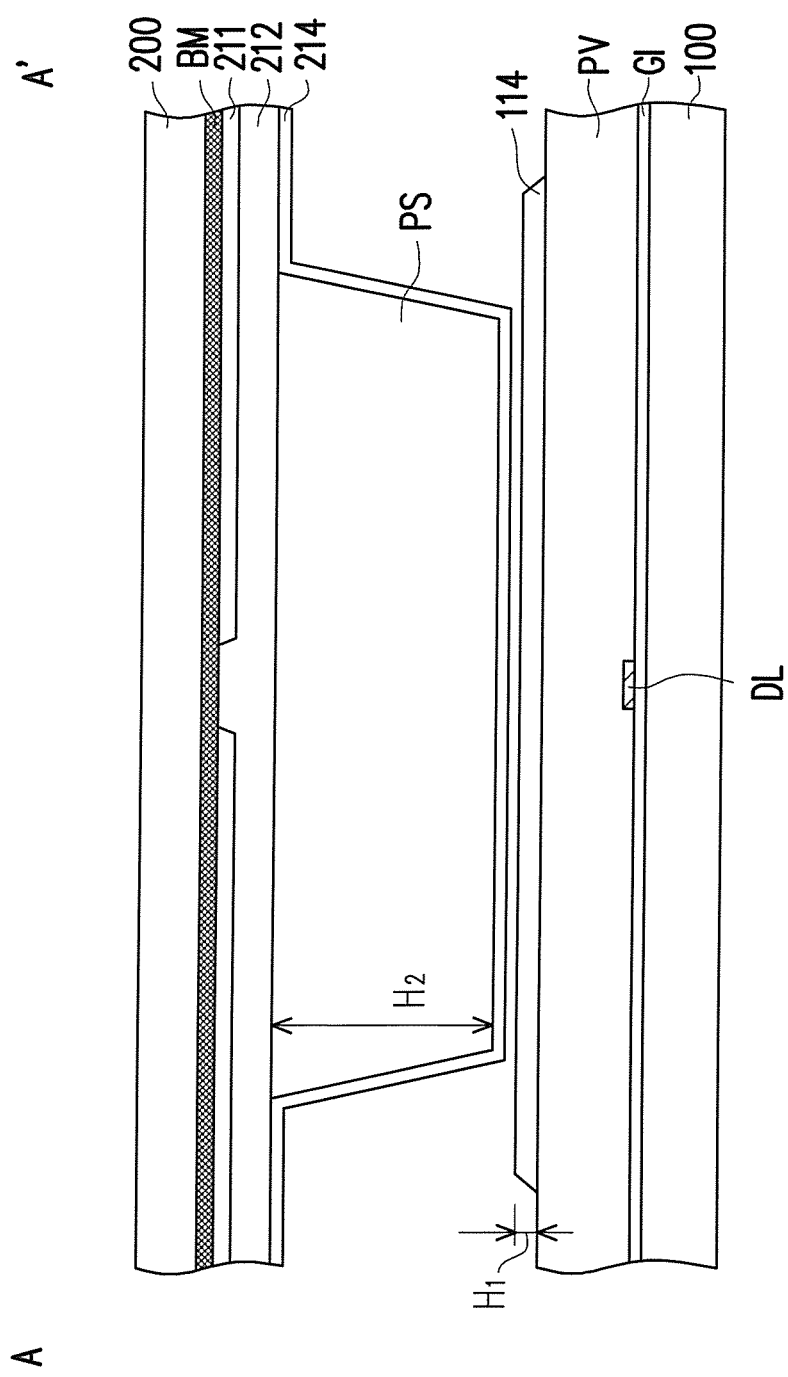
FIG. 3A is a schematic cross-sectional view taken along a section line A-A' depicted in FIG. 2A.
Figure 3B:
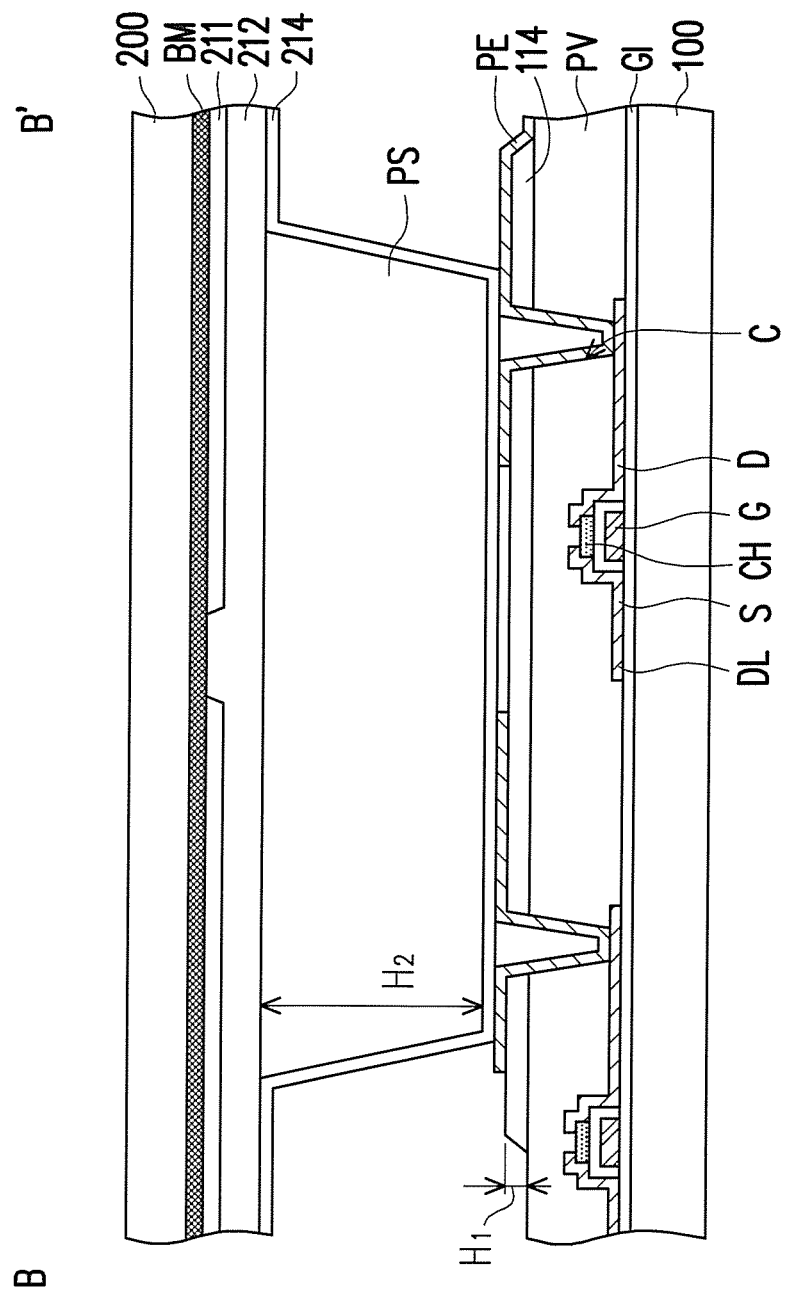
FIG. 3B is a schematic cross-sectional view taken along a section line B-B' depicted in FIG. 2A.

FIG. 1 is a schematic cross-sectional view illustrating a display according to an embodiment of the disclosure. FIG. 2A and FIG. 2B are schematic top views illustrating a display according to an embodiment of the disclosure, and FIG. 2A does not illustrate any black matrix. FIG. 2B shows the arrangement between the black matrix BM and other components. FIG. 3A is a schematic cross-sectional view taken along a section line A-A' depicted in FIG. 2A. FIG. 3B is a schematic cross-sectional view taken along a section line B-B' depicted in FIG. 2A. With reference to FIG. 1 to FIG. 3B, the display provided in the present embodiment includes a first substrate 100, a second substrate 200, and a display medium layer 300, a bump 114 (shown in FIG. 3A and FIG. 3B), and a spacer PS (shown in FIG. 3A and FIG. 3B) that are located between the first substrate 100 and the second substrate 200. The first substrate 100 may be made of glass, quartz, an organic polymer, or the like. A pixel array layer 110 is arranged on the first substrate 100, for instance, and the detailed structure of the pixel array layer 110 will be elaborated in following descriptions.

The second substrate 200 is arranged opposite to the first substrate 100. The second substrate 200 may be made of glass, quartz, an organic polymer, or any other appropriate material. The material of the second substrate 200 may be the same as or different from the material of the first substrate 100, which should however not be construed as a limitation in the disclosure. A color filter array layer 210 is arranged on the second substrate 200, for instance, and the detailed structure of the color filter array layer 210 will be elaborated in following descriptions.

The display medium layer 300 is composed of a liquid crystal material, for instance. That is, the display provided in the present embodiment is a liquid crystal display (LCD), for instance. Nevertheless, the disclosure should not be construed as limited to the embodiments set forth herein. In other embodiments, the display medium layer 300 may also be made of other display material, such as an organic light-emitting diode (LED) material, an inorganic light-emitting diode (LED) material, an electro-phoretic display material, a fluorescent material, a phosphorous material, a plasma material, and so on.

For illustrative purposes, FIG. 2A exemplarily shows a pixel array layer 110 with 2×2 pixel structure and a corresponding color filter array layer; however, people having ordinary skill in the pertinent art should understand that the pixel array layer 110 depicted in FIG. 1 is constituted by a plurality of pixel structures arranged in an array.

With reference to FIG. 2A, FIG. 3A, and FIG. 3B, in the present embodiment, the pixel array layer 110 includes a plurality of scan lines SL, a plurality of data lines DL, a plurality of pixel structures, and a passivation layer PV.

The scan lines SL and data lines DL are located on the first substrate 100. An extension direction of the scan lines SL is different from that of the data lines DL; in the present embodiment, the extension direction of the scan lines SL is perpendicular to that of the data lines DL. As shown in FIG. 2A, in the present embodiment, the data lines DL are extended in a first direction D1, the scan lines SL are extended in a second direction D2, and the first direction D2 and the second direction D2 are substantially perpendicular to each other, for instance. Besides, the scan lines SL and the data lines DL are located in different film layers, and an insulation layer (not shown) is sandwiched between the scan lines SL and the data lines DL. The scan lines SL and the data lines DL serve to transmit driver signals for driving the pixel structures. A material of the scan lines SL and the data lines DL includes a conductive material, such as metal, alloy, metal oxide, metal nitride, metal oxynitride, a stacked layer containing the above materials, and so on.

The pixel structures are located on the first substrate 100. The pixel structures are electrically connected to the scan lines SL and the data lines DL. To be specific, each of the pixel structures includes an active device T and a pixel electrode PE electrically connected to the active device T. Here, the active device T is a thin film transistor (TFT) that includes a gate G, a gate insulation layer GI, a channel layer CH, a source S, and a drain D. The gate G is located on the first substrate 100, the gate insulation layer GI is located on the gate G, the channel layer CH is located on the gate insulation layer GI, and the gate insulation layer GI is located between the channel layer CH and the gate G. The source S and the drain D are located on the two sides of the channel layer CH above the gate G, respectively. A material of the gate G, the source S, and the drain D includes a conductive material, such as metal, alloy, metal oxide, metal nitride, metal oxynitride, a stacked layer containing the above materials, and so on. A material of the channel layer CH includes semiconductors, e.g., an amorphous silicon semiconductor, a metal oxide semiconductor, an organic semiconductor, and so on. A material of the gate insulation layer GI includes an inorganic material, an organic material, a combination thereof, or a stacked layer containing said materials, and the inorganic material is, for instance, silicon oxide, silicon nitride, or silicon oxynitride.

In the present embodiment, the active device T is a bottom-gate TFT, for instance, which should however not be construed as a limitation in the disclosure; in other embodiments, the active device T may be a top-gate TFT or any other type of active device. Moreover, in the present embodiment, each pixel structure merely has one active device, for instance, which should however not be construed as a limitation in the disclosure.

In the present embodiment, the passivation layer PV covers the scan lines SL, the data lines DL, and the active device T, for instance, and the bump 114 is arranged on the passivation layer PV. According to the present embodiment, the bump 114 and the passivation layer PV collectively have at least one opening C that exposes the drain D of the active device T, for instance. The pixel electrode PE is conformally arranged on the bump 114, for instance, and the pixel electrode PE is electrically connected to the drain D (as shown in FIG. 3B) of the active device T through the at least one opening C. In the present embodiment, the bump 114 is located at an intersection between one of the scan lines SL and one of the data lines DL and has a thickness H1, for instance. Here, the bump 114 is overlapped with two adjacent pixel structures P, as exemplarily shown in FIG. 2A, FIG. 2B, FIG. 3A, and FIG. 3B.

A material of the bump 114 and a material of the passivation layer PV are insulation materials, for instance, such as inorganic materials, organic materials, a combination thereof, or a stacked layer containing the aforesaid materials. Here, the inorganic materials are silicon oxide, silicon nitride, silicon oxynitride, a combination, or any other appropriate material, for instance; the organic materials are, for instance, polyester (PET), polyolefne, polypropylene, polycarbonate, polyalkylene oxide, polystyrene, polyether, polyketone, polyalcohol, polyaldehyde, any other appropriate material, or a combination thereof. In the present embodiment, the bump 114 and the passivation layer PV are made of the same material, for instance. Particularly, the bump 114 and the passivation layer PV are integrally formed, for instance. An insulation material layer is formed on the first substrate 100, and the insulation material layer is patterned by performing a photolithography and etching process, so as to form the insulation material layer with protruding parts. The substantially flat insulation material layer serves as the passivation layer PV, and the protruding part serves as the bump 114. The photolithography and etching process is, for instance, half-tone mask (HTM) process, for instance. The opening C may be further formed in the passivation layer PV and the bump 114, and the pixel electrode PE may be formed on the passivation layer PV and the bump 114. The method of forming the opening C includes, for example, performing a photolithography and etching process; however, the disclosure should not be limited to the embodiment set forth herein. The pixel electrode PE may be a transmissive pixel electrode, a reflective pixel electrode, or a transflective pixel electrode.

According to the present embodiment, the pixel array layer 110 further includes common lines CL located on the edge of the pixel areas, for instance. The common lines CL may be coupled to the pixel electrodes PE to form storage capacitors (not shown). The common lines CL, the data lines DL, the gates G, and the scan lines SL are electrically insulated from one another. In the present embodiment, the common lines CL and the scan lines SL are located in the same film layer, and the common lines CL and the data lines DL are located in different film layers, for instance; however, the disclosure is not limited thereto. In another embodiment, the common lines CL and the data lines DL may be located in the same film layer, and the common lines CL and the scan lines SL are located in different film layers.

With reference to FIG. 3A and FIG. 3B, the color filter array layer 210 includes a plurality of filter patterns 211, the black matrix BM, and the cover layer 212, for instance. The filter patterns 211 are located on the second substrate 200 and respectively correspond to one of the pixel structures on the pixel array layer 110 on the first substrate 100, for instance. The filter patterns 211 may be red, green, or blue filter patterns.

The black matrix BM is arranged on the second substrate 200 and between the filter patterns 211. Specifically, the black matrix BM defines a plurality of unit areas (not shown) corresponding to the pixel structures, and the filter patterns 211 are respectively arranged in the unit areas. In the present embodiment as shown in FIG. 2A, FIG. 2B, FIG. 3A, and FIG. 3B, the black matrix BM covers the spacer PS and the bump 114, for instance, and the black matrix BM is overlapped with the scan lines SL, the data lines DL, the active devices T, the bump 114, and the spacer PS, so as to prevent the non-transparent components from lowering the aperture ratio of the pixel structures. The black matrix BM located at the intersection of one of the scan lines SL and one of the data lines DL has the structure and the shape similar to those of the underlying bump 114 according to the present embodiment.

The cover layer 212 is arranged on the second substrate 200 and covers the filter patterns 211 and the black matrix BM, for instance. A material of the cover layer 212 is, for instance, an insulation material, and descriptions of the insulation material may be deduced from the descriptions of the insulation material of the passivation layer PV and thus will not be provided hereinafter.

The spacer PS is located on the second substrate 200 and has a thickness H2, for instance. The spacer PS and the bump 114 are at least partially overlapped with each other and are overlapped with the black matrix BM. In the present embodiment, as shown in FIG. 3B, the spacer PS is located above the opening C and overlapped with the opening C.

Besides, as shown in FIG. 3B, the pixel electrode PE is sandwiched between the spacer PS and the bump 114. Hence, in an area where the spacer PS and the bump 114 are overlapped, the bump 114 that is not covered by the pixel electrode PE is not in contact with the spacer PS, i.e., a gap exists between the bump 114 and the spacer PS, for instance. For instance, the spacer PS in contact with the pixel electrode PE is supported by the pixel electrode PE, and thus the spacer PS that is partially not in contact with the pixel electrode PE is suspended in the midair above the bump 114, as shown in FIG. 3A and FIG. 3B. However, as long as the spacer PS is pressed by an external force, the spacer PS may be in contact with the bump 114 that is not covered by the pixel electrode PE.

In the present embodiment, the display further includes an alignment layer 214 arranged between the display medium layer 300 and the color filter layer 210, for instance. Hence, the alignment layer 214 is located between the spacer PS and the bump 114 (as shown in FIG. 3A and FIG. 3B); however, the disclosure is not limited thereto. In an embodiment of the disclosure, the alignment layer (not shown) may be located between the display medium layer 300 and the pixel array layer 110; for instance, the passivation layer PV and the pixel electrode PE may be covered by the alignment layer, such that the alignment layer is located between the spacer PS and the bump 114. In another embodiment (not shown) of the disclosure, the display may be equipped with the alignment layer (not shown) located on the first substrate 100 and the alignment layer (not shown) on the second substrate 200, such that the spacer PS is located between two alignment layers.

Figure 4:
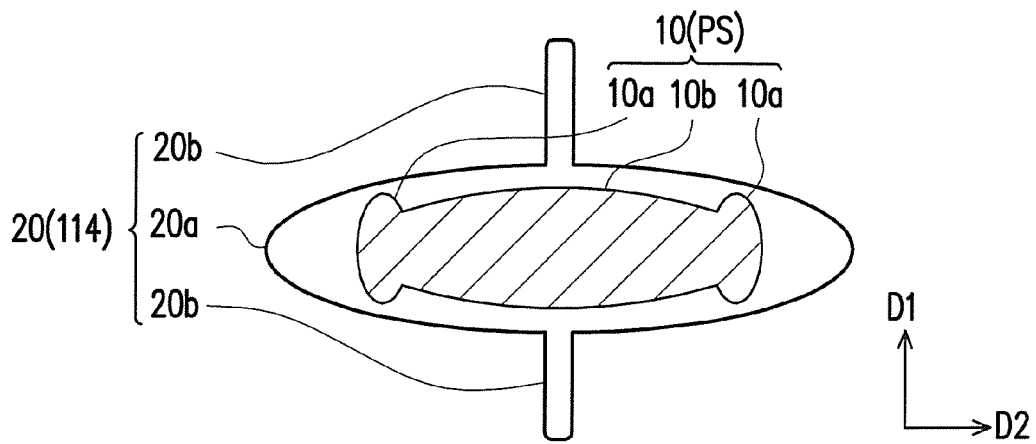
FIG. 4 is a schematic enlarged view illustrating a relative position between a bump and a spacer in a region R depicted in FIG. 2A.
Figure 5:
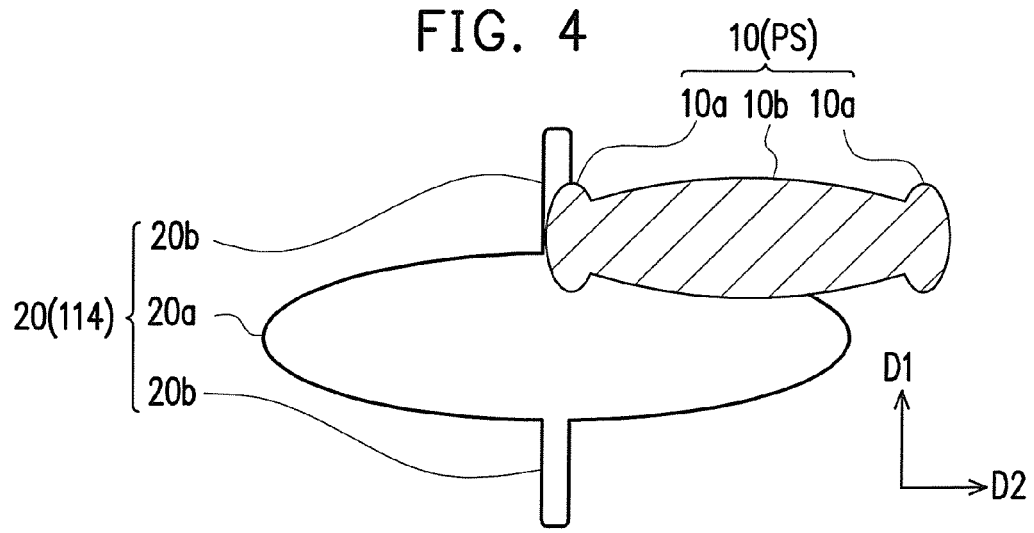
FIG. 5 is a schematic enlarged view illustrating a relative position between the bump and the spacer in the region R depicted in FIG. 2A.
Figure 6:
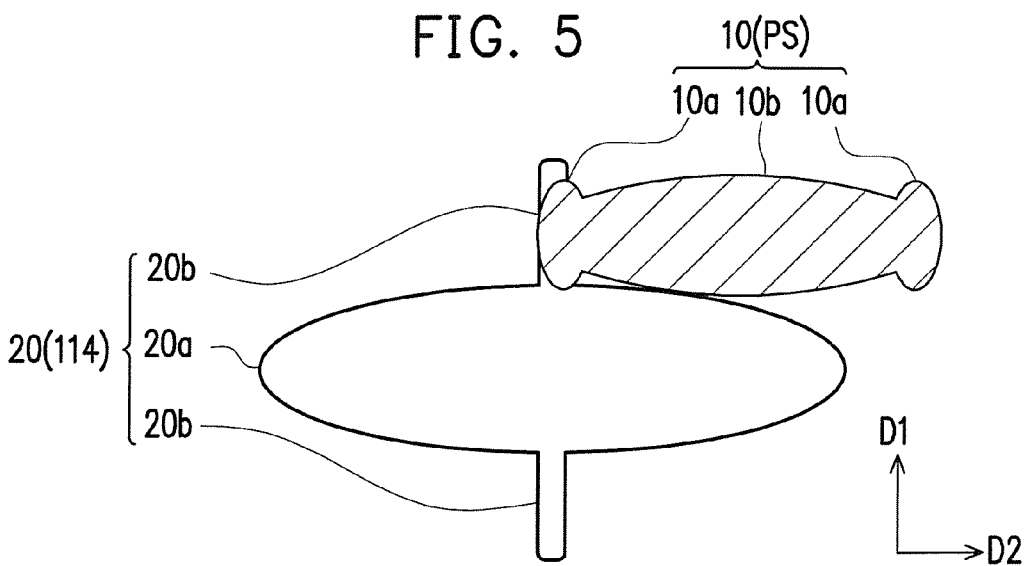
FIG. 6 is a schematic enlarged view illustrating a relative position between the bump and the spacer in the region R depicted in FIG. 2A.

FIG. 4 to FIG. 6 are schematic enlarged views illustrating relative positions between the bump and the spacer in the region R depicted in FIG. 2A With reference to FIG. 4 to FIG. 6, one of the bump 114 and the spacer PS has a first shape 10 and the other has a second shape 20. In the present embodiment, the spacer PS has the first shape 10, and the bump 114 has the second shape 20, for instance. Besides, each of lengths of two end sections 10a of the first shape 10 in a first direction D1 is larger than a length of a middle section 10b of the first shape 10 in the first direction D1. The two end sections 10a of the first shape 10 extend along the first direction D1, and the middle section 10b is located between the two end sections 10a.

Thereby, when the first substrate 100 and the second substrate 200 are misaligned because the display is bent or pressed, the contact area between the spacer PS and the bump 114 is relatively large, for instance. When the first substrate 100 and the second substrate 200 are properly aligned, as exemplarily shown in FIG. 4, the spacer PS and the bump 114 are completely overlapped without deviation. If the first substrate 100 and the second substrate 200 are misaligned to a great extent, as shown in FIG. 5, the spacer PS and the bump 114 are partially overlapped, for instance, and the two end sections 10a of the first shape 10 are partially overlapped with the second shape 20. If the first substrate 100 and the second substrate 200 are misaligned to a greater extent, as shown in FIG. 6, the spacer PS and the bump 114 are partially overlapped with significant deviation, for instance; one of the two end sections 10a of the first shape 10 is overlapped with the bump 114, and the other end section 10a of the first shape 10 and the middle section 10b of the first shape 10 are not overlapped with the bump 114, for instance.

Figure 7A:
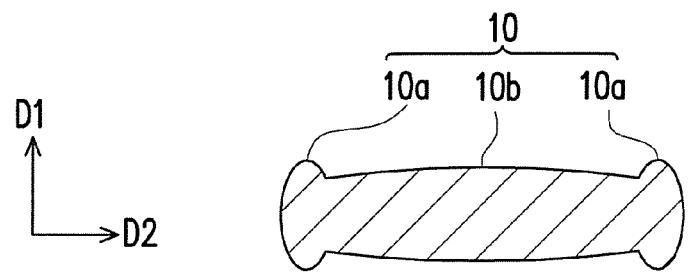
FIG. 7A to FIG. 7D schematically illustrate a first shape defined in the disclosure.
Figure 7B:
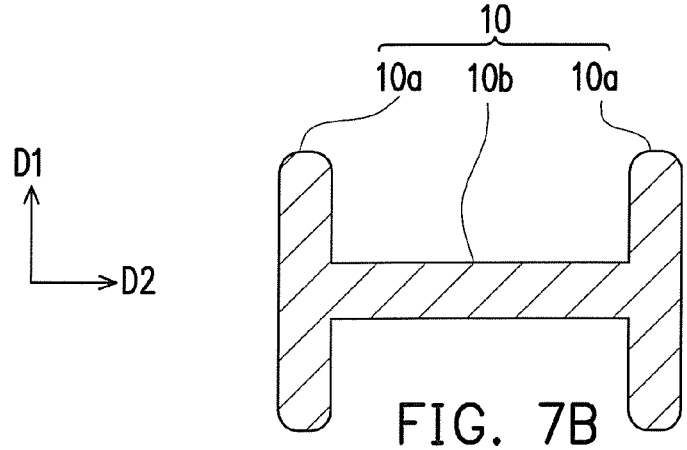
Figure 7C:
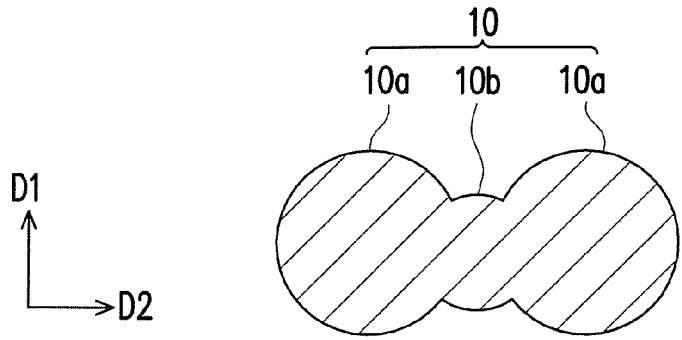
Figure 7D:
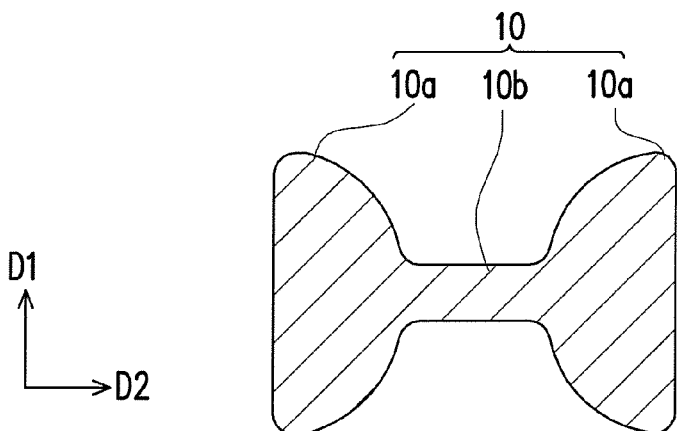
Figure 8A:
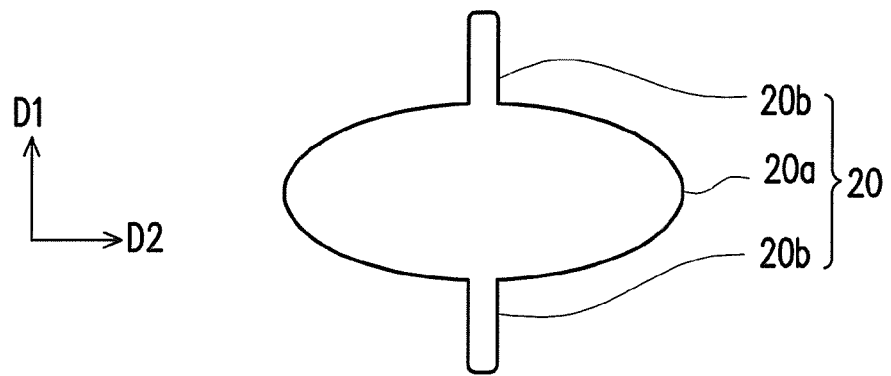
FIG. 8A to FIG. 8F schematically illustrate a second shape defined in the disclosure.
Figure 8B:
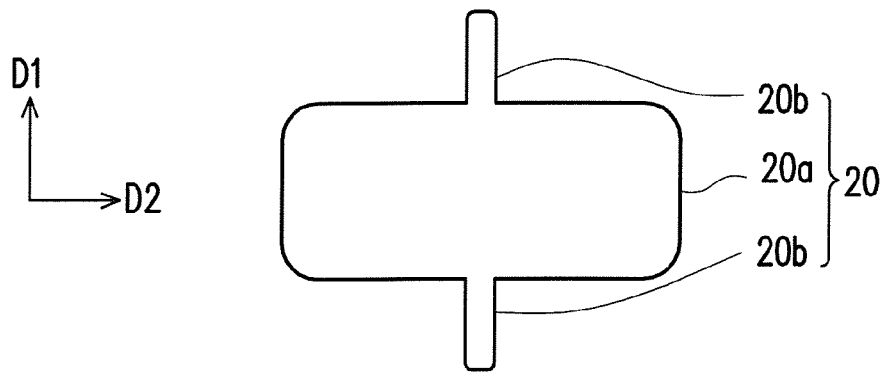
Figure 8C:
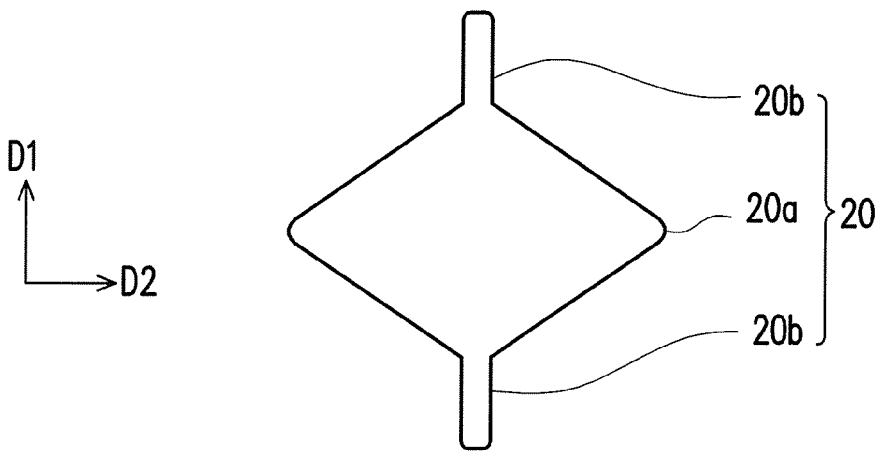
Figure 8D:
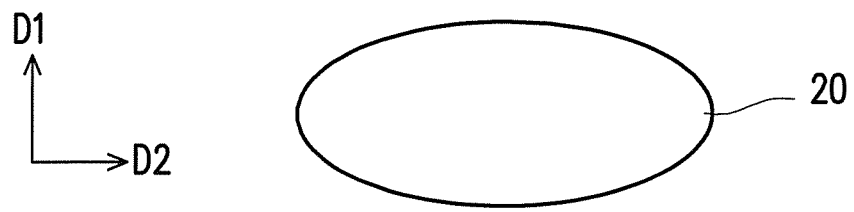
Figure 8E:
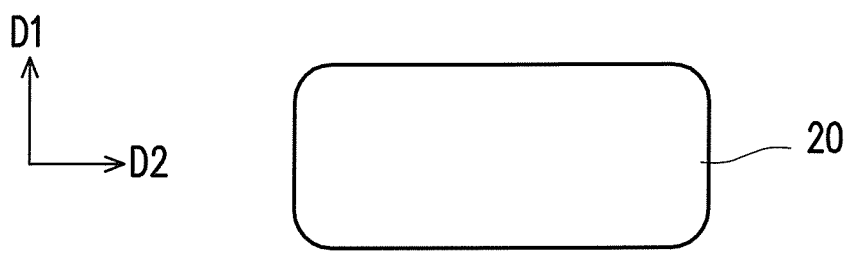
Figure 8F:
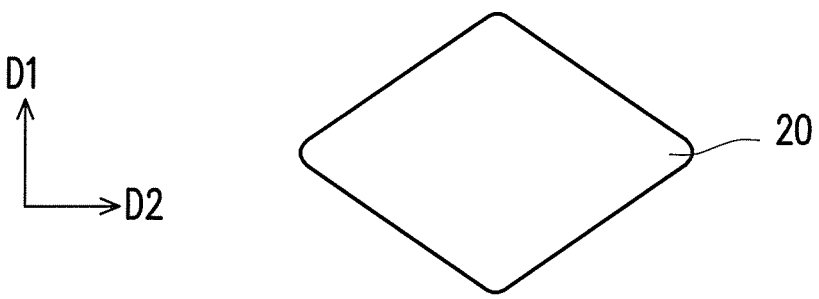

In the previous embodiments, the first shape 10 and the second shape 20 are the shapes shown in FIG. 2A; however, the disclosure is not limited thereto, and the first shape 10 and the second shape 20 may have various designs according to actual requirements. For instance, as shown in FIG. 7A to FIG. 7D, the first shape 10 may be a prism shaped as a letter I (as shown in FIG. 7A), a prism shaped as a letter H (as shown in FIG. 7B), a shape composed of multiple partially overlapped circles (as shown in FIG. 7C), or a prism shaped as a dumbbell (as shown in FIG. 7D). Each of the lengths of two end sections 10a of the first shape 10 is larger than the length of the middle section 10b of the first shape 10. In addition, as shown in FIG. 8A to FIG. 8C, the second shape 20 includes a main portion 20a and at least one extension portion 20b, for instance. The main portion 20a extends along a second direction D2, and the at least one extension portion 20b extends along the first direction D1 from a center of the main portion 20a. The second shape 20 may be the shape shown in FIG. 8D to FIG. 8F, so as to comply with the requirements of certain displays for high resolution (pixel per inch, PPI), for instance.

Figure 9A:
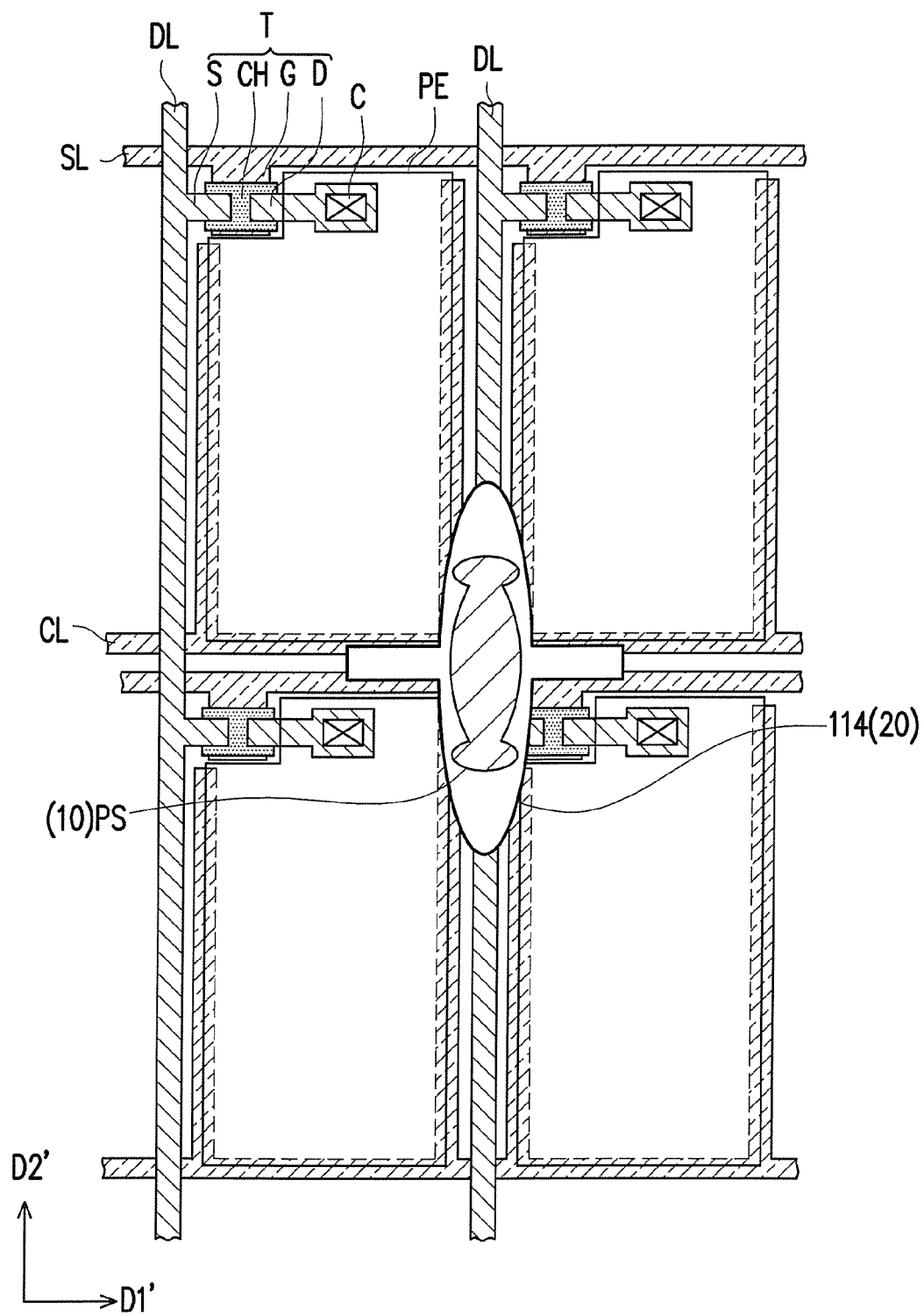
FIG. 9A and FIG. 9B are schematic top views illustrating a display according to another embodiment of the disclosure, and FIG. 9A does not illustrate any black matrix.
Figure 9B:
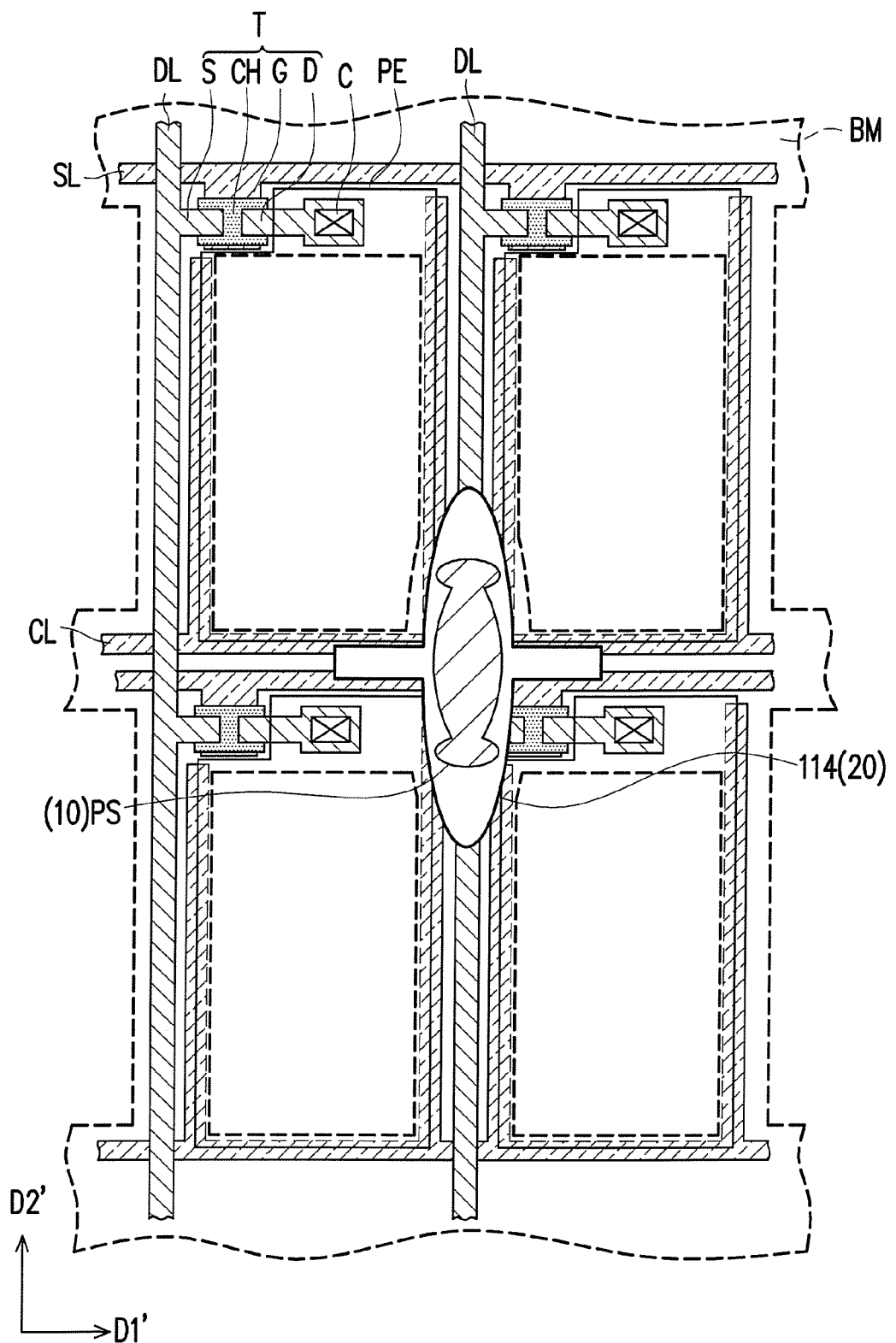

In the present embodiment, the spacer PS has the first shape 10, the bump 114 has the second shape 20, the first direction D1 is the extension direction of the data lines DL, and the second direction D2 is the extension direction of the scan lines SL, for instance. However, the disclosure is not limited thereto. That is, in an embodiment (not shown), the spacer PS has the second shape 20, and the bump 114 has the first shape 10. In another embodiment of the disclosure, as shown in FIG. 9A and FIG. 9B, the first direction D1' may be the extension direction of the scan lines SL, and the second direction D2' may be the extension direction of the data lines DL, for instance. In the first direction D1', each of the lengths of two end sections of the first shape 10 is larger than the length of the middle section of the first shape 10. The main portion 20a of the second shape 20 extends along the second direction D2', and the extension portion 20b extends along the first direction D1'. In the present embodiment, the bump 114 is not equipped with the opening C, and the spacer PS is not located above the opening C, for instance.

In the previous embodiment, one of the bump 114 and the spacer PS has the first shape 10 and the other has the second shape 20 corresponding to the first shape 10. Each of the lengths of two end sections of the first shape 10 is larger than the length of the middle section of the first shape 10. Thereby, if the first substrate 100 and the second substrate 200 are misaligned because the display is bent or pressed, the contact area between the spacer PS and the bump 114 is relatively large, and the cell gap is maintained, such that the spacer PS is prevented from scratching the display area. Accordingly, the spacer PS is able to enhance the tolerance for misalignment, prevent the spacer PS from scratching the film layers (e.g., the alignment layer) located in the display area, and further resolve the issue of dark-state light leakage of the display. Besides, the spacer PS and the bump 114 are substantially overlapped with the non-transparent components, such as the black matrix BM, the scan lines SL, and the data lines DL, and thus the aperture ratio of the display is not affected.

Figure 10A:
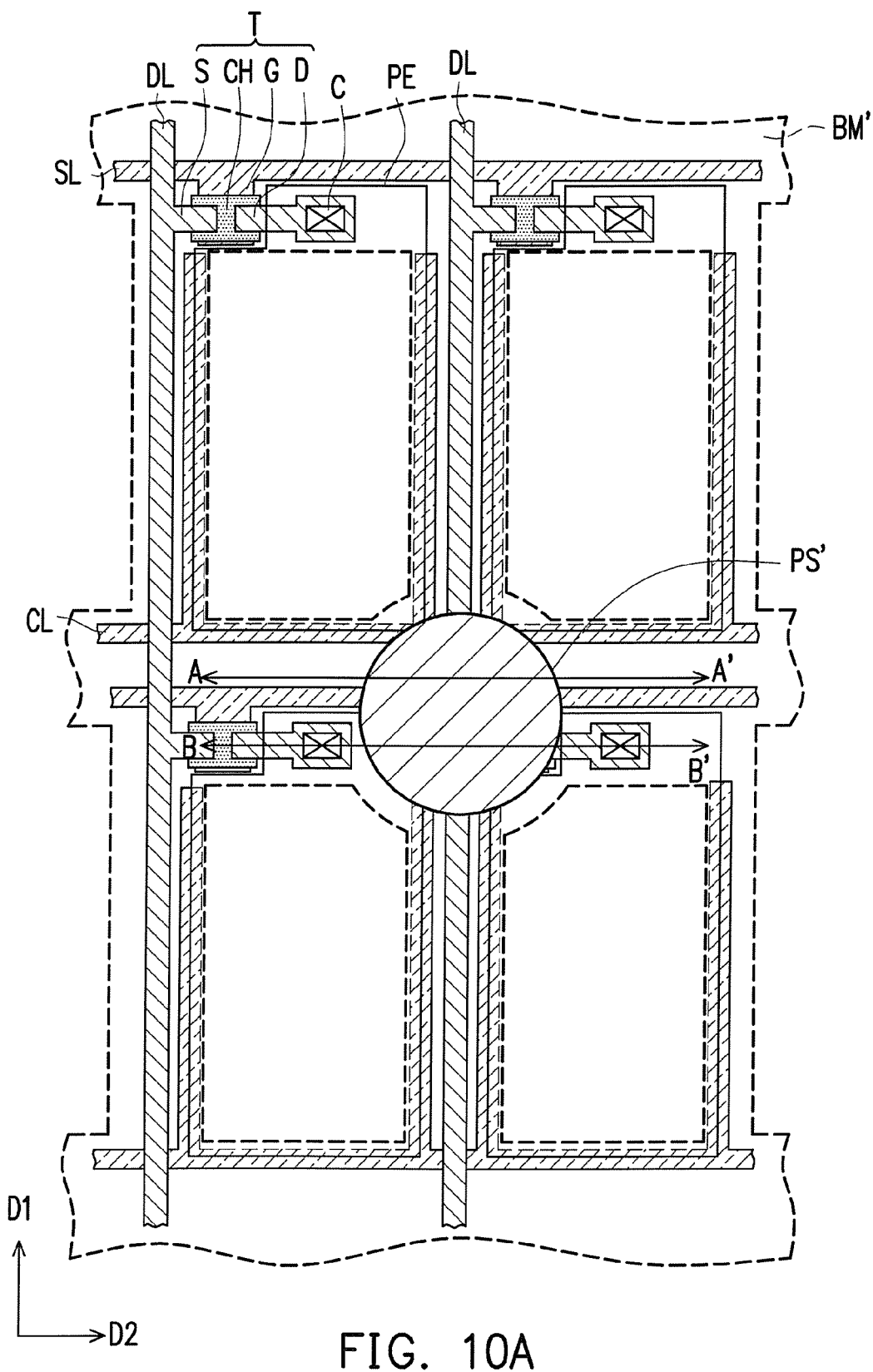
FIG. 10A is a schematic top view illustrating a first conventional display.
Figure 10B:
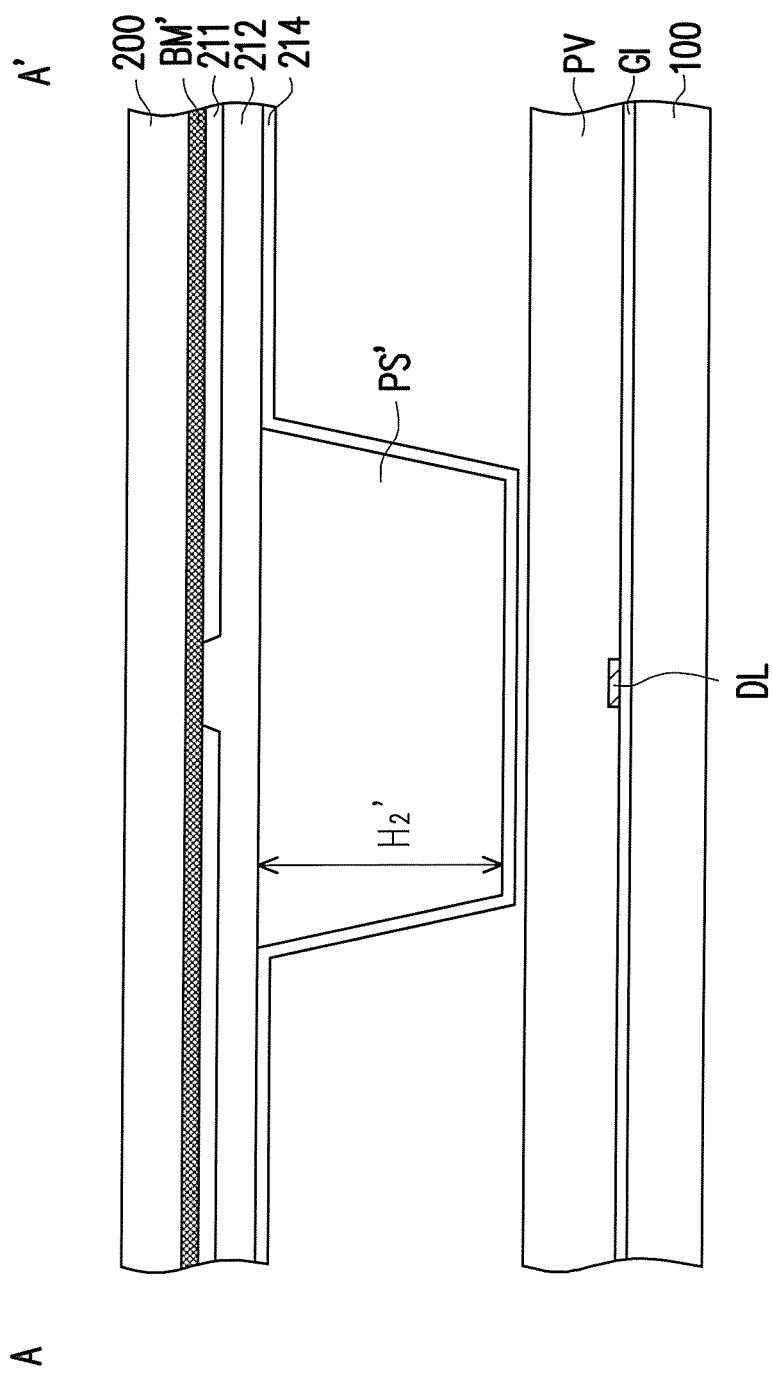
FIG. 10B is a schematic cross-sectional view taken along a section line A-A' depicted in FIG. 10A.
Figure 10C:
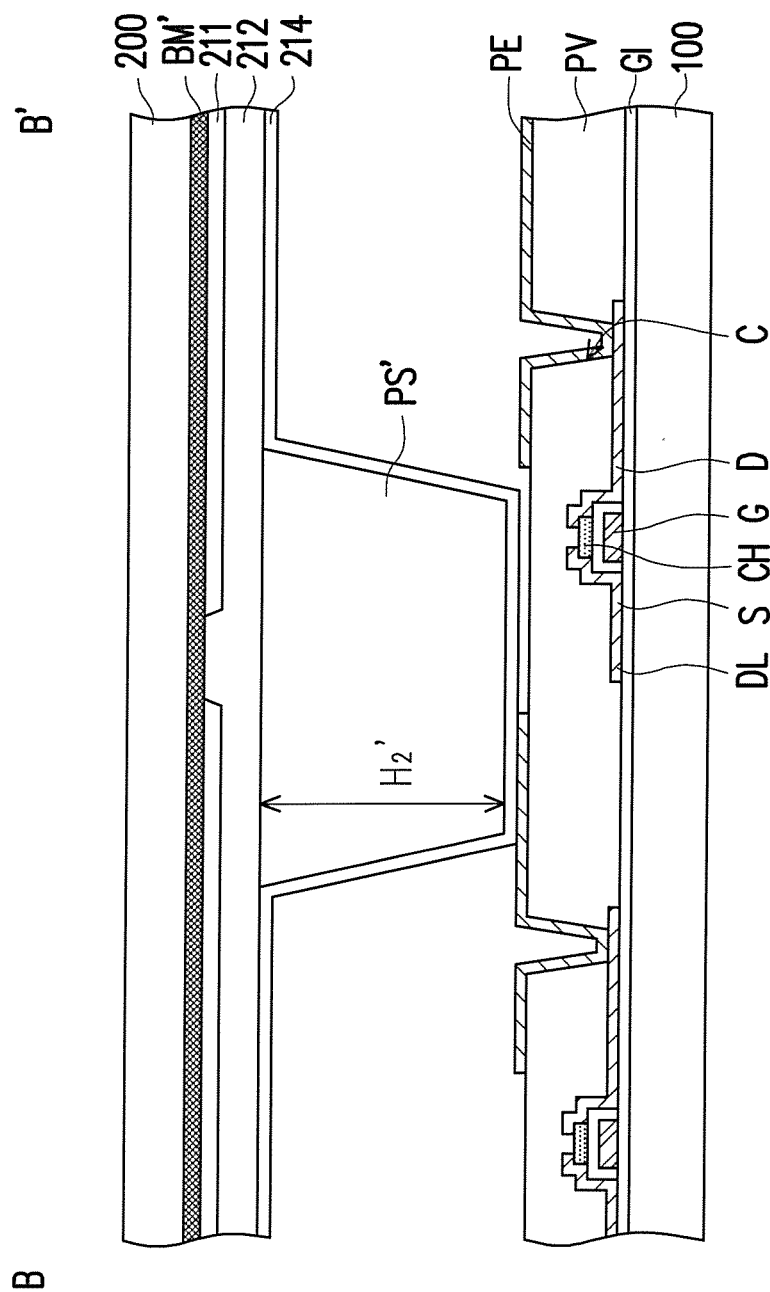
FIG. 10C is a schematic cross-sectional view taken along a section line B-B' depicted in FIG. 10A.

FIG. 10A is a schematic top view illustrating a first conventional display according to a comparison example 1 in an experiment described below. FIG. 10B is a schematic cross-sectional view taken along a section line A-A' depicted in FIG. 10A. FIG. 10C is a schematic cross-sectional view taken along a section line B-B' depicted in FIG. 10A. The conventional display shown in FIG. 10A is similar to the display depicted in FIG. 2A; therefore, the identical or similar devices in these embodiments are represented by the identical or similar reference numbers and will not be further explained. The difference between the structure of the display provided in the comparison example 1 as shown in FIG. 10A and the structure of the display provided in an embodiment of the disclosure as shown in FIG. 2A lies in that the display provided in the comparison example 1 as shown in FIG. 10A does not have the bump 114, and a spacer PS' is taken to replace the spacer PS shown in FIG. 2A.

With reference to FIG. 10A to FIG. 10C, the spacer PS' provided in the comparison example 1 is located on the second substrate 200 and has a thickness H2', for instance. Particularly, the spacer PS' is located at the intersection between one of the data lines DL and one of the scan lines SL and is overlapped with the black matrix BM'. Besides, in the comparison example 1, the spacer PS' is not overlapped with the opening C, as shown in FIG. 10A and FIG. 10C. The spacer PS' has a circular shape, for example. The black matrix BM' located at the intersection of one of the scan lines SL and one of the data lines DL has the structure and the shape similar to those of the underlying spacer PS' according to the present embodiment, for instance. Additionally, as shown in FIG. 10C, the pixel electrode PE is sandwiched between the spacer PS' and the passivation layer PV. Hence, the passivation layer PV that is not covered by the pixel electrode PE is not in contact with the spacer PS', i.e., a gap exists between the passivation layer PV and the spacer PS', for instance. Namely, the spacer PS' in contact with the pixel electrode PE is supported by the pixel electrode PE, and thus the spacer PS' that is partially not in contact with the pixel electrode PE is suspended in the midair above the passivation layer PV, as shown in FIG. 10B and FIG. 1C However, as long as the spacer PS' is pressed by an external force, the spacer PS' may be in contact with the passivation layer PV that is not covered by the pixel electrode PE.

Figure 11A:
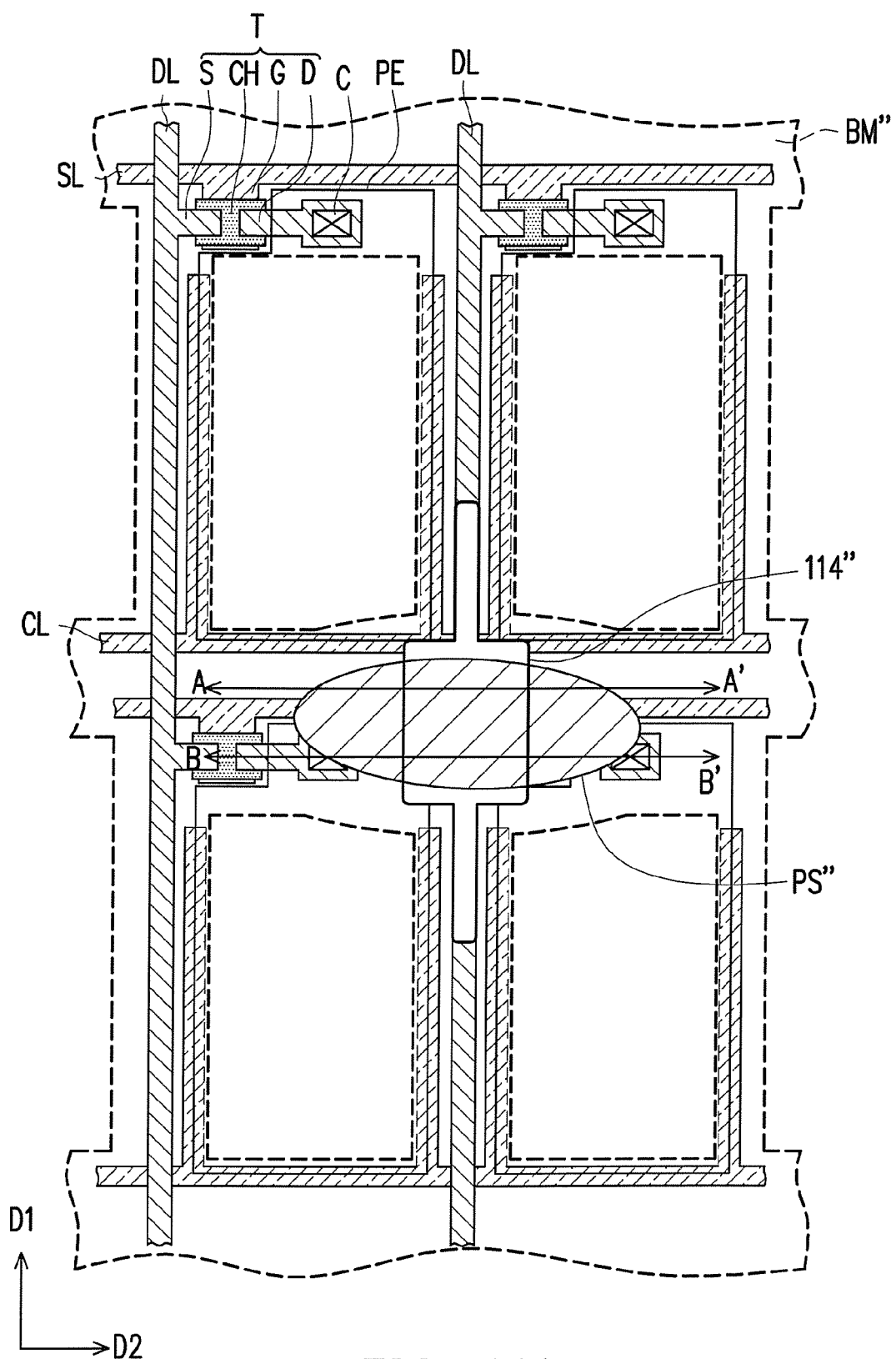
FIG. 11A is a schematic top view illustrating a second conventional display.
Figure 11B:
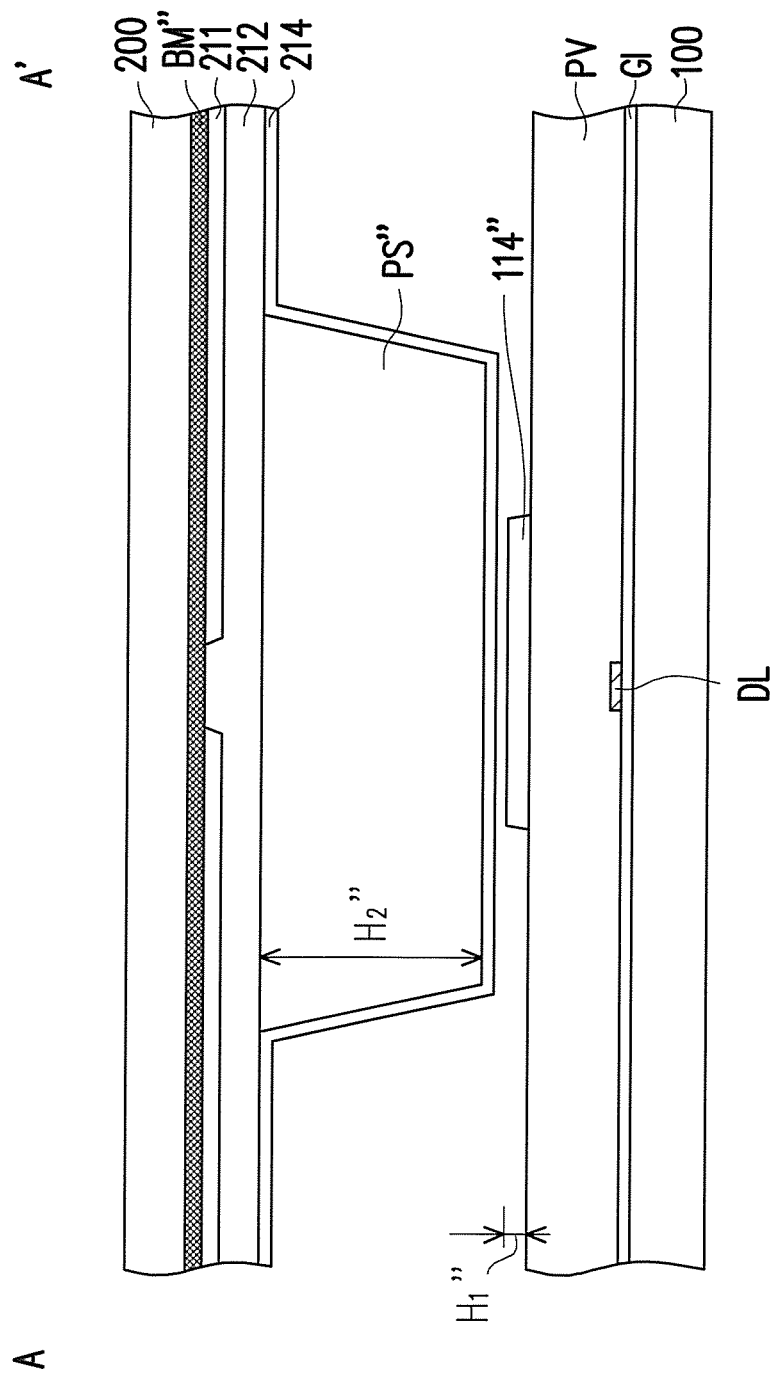
FIG. 11B is a schematic cross-sectional view taken along a section line A-A' depicted in FIG. 11A.
Figure 11C:
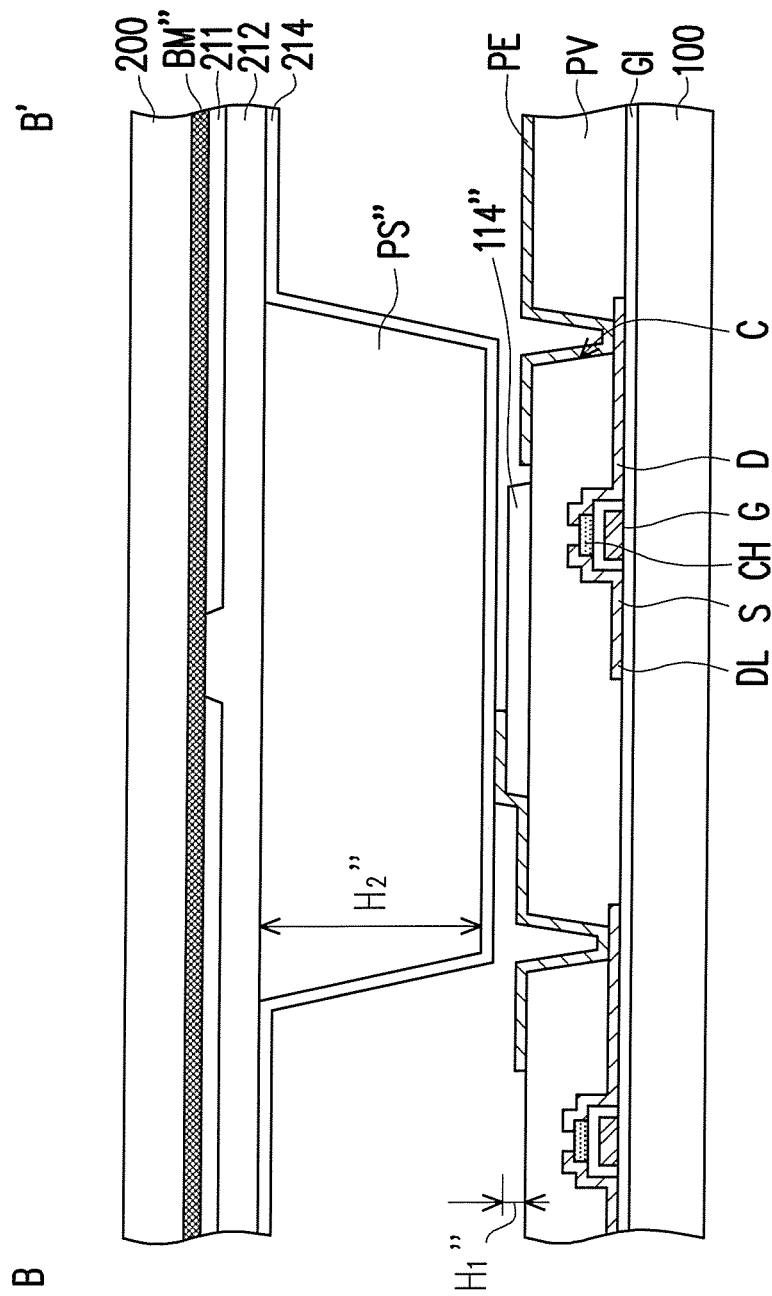
FIG. 11C is a schematic cross-sectional view taken along a section line B-B' depicted in FIG. 11A.

FIG. 11A is a schematic top view illustrating a second conventional display according to a comparison example 2 in an experiment described below. FIG. 11B is a schematic cross-sectional view taken along a section line A-A' depicted in FIG. 11A. FIG. 11C is a schematic cross-sectional view taken along a section line B-B' depicted in FIG. 11A. The conventional display shown in FIG. 11A is similar to the display depicted in FIG. 2A; therefore, the identical or similar devices in these embodiments are represented by the identical or similar reference numbers and will not be further explained. The difference between the structure of the display provided in the comparison example 2 as shown in FIG. 11A and the structure of the display provided in an embodiment of the disclosure as shown in FIG. 2A lies in that a bump 114" and a spacer PS" in the display provided in the comparison example 2 as shown in FIG. 11A are taken to replace the bump 114 and the spacer PS shown in FIG. 2A. With reference to FIG. 11A to FIG. 11C, the bump 114" provided in the comparison example 2 is located on the passivation layer PV and does not have any opening, as shown in FIG. 11C. The bump 114" is located at an intersection between one of the scan lines SL and one of the data lines DL and has a thickness H1", for instance. Here, the bump 114" is overlapped with two adjacent pixel structures P, as exemplarily shown in FIG. 11A and FIG. 11C. On the other hand, the spacer PS" is located on the second substrate 200 and has a thickness H2", for instance. Particularly, the spacer PS" is located at the intersection between one of the data lines DL and one of the scan lines SL and is overlapped with the black matrix BM", and the spacer PS" and the bump 114" are overlapped. In the comparison example 2, the spacer PS" is located above the opening C and partially overlapped with the opening C, as shown in FIG. 11A and FIG. 11C. The spacer PS" has an elliptic shape, for example. The black matrix BM" located at the intersection of one of the scan lines SL and one of the data lines DL has the structure and the shape similar to those of the underlying spacer PS" according to the present embodiment, for instance. Additionally, as shown in FIG. 11C, the pixel electrode PE is sandwiched between the spacer PS" and the bump 114". Hence, in an area where the spacer PS" and the bump 114" are overlapped, the bump 114" that is not covered by the pixel electrode PE is not in contact with the spacer PS", i.e., a gap exists between the bump 114" and the spacer PS", for instance. In other words, the spacer PS" in contact with the pixel electrode PE is supported by the pixel electrode PE, and thus the spacer PS" that is partially not in contact with the pixel electrode PE is suspended in the midair above the bump 114", as shown in FIG. 11B and FIG. 11C. Certainly, as long as the spacer PS" is pressed by an external force, the spacer PS" may be in contact with the bump 114" that is not covered by the pixel electrode PE.

Figure 12:
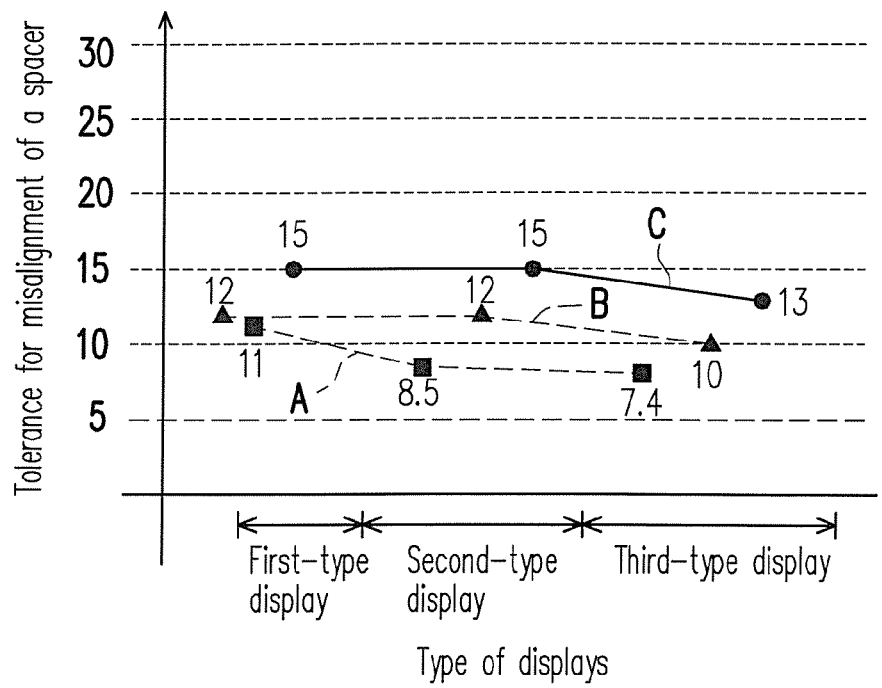
FIG. 12 is a curve diagram illustrating a correlation between the type of a display and a tolerance for misalignment of a spacer in the display according to an experimental example of the disclosure.

FIG. 12 is a curve diagram illustrating a correlation between the type of a display and a tolerance for misalignment of a spacer in the display according to an experimental example of the disclosure. The horizontal axis stands for several types of displays with different resolutions; the resolutions of the first-type to the third-type displays (from left to right) gradually increase: the first-type display is a full high definition (FHD) display, the second-type display is a wide quad high definition (WQHD) display, and the third-type display is an ultra high definition (UHD) display. The perpendicular axis represents the tolerance for misalignment of the spacer in the display. As shown in FIG. 12, the curve C (a solid curve) represents a measurement curve of a display according to an embodiment of the disclosure, and curves A and B (dotted curves) respectively stand for the measurement curve of the display provided in the comparison example 1 as shown in FIG. 10A to FIG. 10C and the measurement curve of the display provided in the comparison example 2 as shown in FIG. 11A to FIG. 11C. In the experimental example, the displays represented by the curves A to C differ from one another because the shape and the structures of the spacers and/or the bumps between two substrates in these displays are different. Given that the displays have the same resolution, it can be deduced from FIG. 12 that the display provided in an embodiment of the disclosure has the enhanced tolerance for misalignment of the spacer in comparison with the displays provided in the comparison examples 1 and 2.

Figure 13:
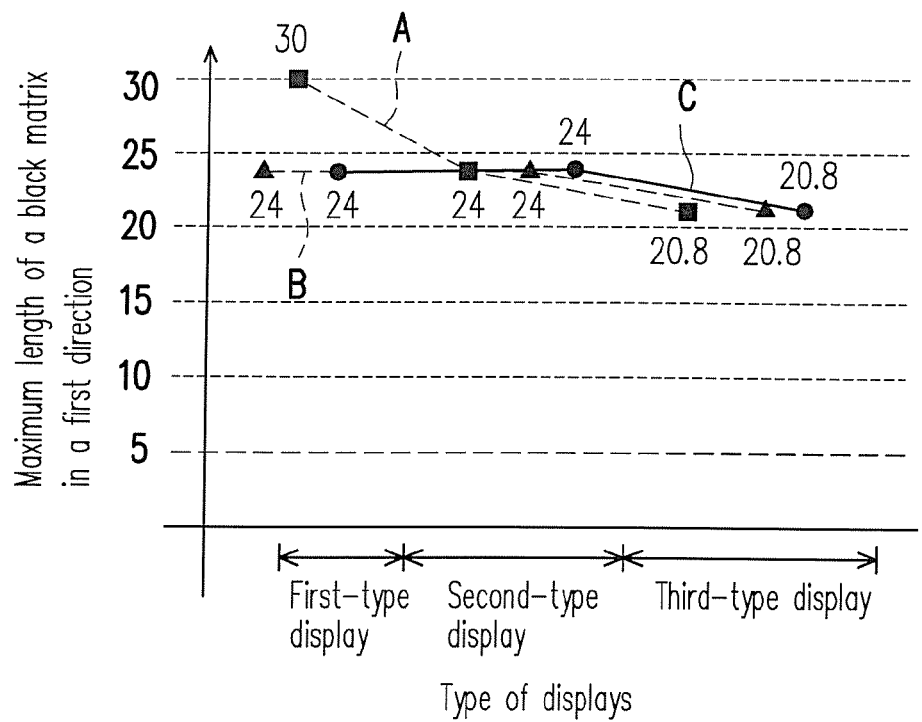
FIG. 13 is a curve diagram illustrating a correlation between the type of a display and a maximum length of a black matrix in a first direction in the display according to an experimental example of the disclosure.

FIG. 13 is a curve diagram illustrating a correlation between the type of a display and a maximum length of a black matrix in a first direction in the display according to an experimental example of the disclosure. The horizontal axis may be the same as that provided in FIG. 12, and the perpendicular axis stands for the maximum length of the black matrix in the first direction in the display. As shown in FIG. 13, the curve C (a solid curve) represents a measurement curve of a display according to an embodiment of the disclosure, and curves A and B (dotted curves) respectively stand for the measurement curve of the display provided in the comparison example 1 and the measurement curve of the display provided in the comparison example 2. As discussed above, the displays represented by the curves A to C differ from one another because the shape and the structures of the spacers and/or the bumps between two substrates in these displays are different. Given that the distances where the spacers of these display travel stay unchanged, it can be deduced from FIG. 13 that the display provided in an embodiment of the disclosure has the relatively large aperture ratio in comparison with the displays provided in the comparison examples 1 and 2. Hence, the display provided herein has the favorable display quality. In particular, the black matrixes with the same shape are applied in the comparison examples 1-2 and the present experimental example; as provided herein, one of the bump and the spacer has the special shape whose end section has the length greater than the length of the middle section in the first direction, such that the tolerance for misalignment of the spacer can be enhanced. Therefore, in order for the displays provided in the comparison examples 1 and 2 to have the enhanced tolerance for misalignment of the spacer, the area occupied by the black matrix should be expanded. The expanded area occupied by the black matrix however results in the decrease in the aperture ratio of the displays in the comparison examples 1 and 2.

To sum up, one of the bump and the spacer has the special shape of which the two end sections each have the length greater than the length of the middle section. When the spacer is misaligned in an oblique direction, owing to the special shape, the contact area between the spacer and the bump can be increased, the cell gap can be maintained, the spacer can be prevented from scratching the display area, and further the tolerance for misalignment of the spacer can be enhanced. Thereby, as long as the two substrates are misaligned because of the bent or pressed display, the film layers (e.g., the alignment layer) located in the display area can be prevented from being scratched by the spacer, and the issue of dark-state light leakage of the display can be resolved to a great extent. Besides, the spacer and the bump are substantially overlapped with the non-transparent components, such as the black matrix, the scan lines, and the data lines, and thus the aperture ratio of the display is not affected. As a result, the display provided herein is characterized by favorable aperture ratio and display quality.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A display comprising:
   a first substrate;
   a plurality of scan lines, a plurality of data lines, a plurality of pixel structures, and a passivation layer all located on the first substrate;
   a bump arranged on the first substrate;
   a second substrate arranged opposite to the first substrate; and
   a spacer arranged on the second substrate and at least partially overlapped with the bump, one of the bump and the spacer having a first shape and the other having a second shape, wherein each of lengths of two end sections of the first shape in a first direction is larger than a length of a middle section of the first shape in the first direction, and the second shape comprises a main portion and at least one extension portion, the main portion extends along a second direction, and the at least one extension portion extends along the first direction from a center of the main portion.

2. The display of claim 1, wherein the first direction is an extension direction of the data lines.

3. The display of claim 1, wherein the first direction is an extension direction of the scan lines.

4. The display of claim 1, wherein the first direction is an extension direction of the data lines, and the second direction is an extension direction of the scan lines.

5. The display of claim 1, wherein the spacer has the first shape, and the bump has the second shape.

6. The display of claim 1, wherein the bump has the first shape, and the spacer has the second shape.

7. The display of claim 1, wherein a material of the bump is the same as a material of the passivation layer.

8. The display of claim 1, wherein the bump and the passivation layer collectively have at least one opening, and the spacer is located above and overlapped with the at least one opening.

9. The display of claim 8, wherein each of the pixel structures comprises an active device and a pixel electrode, and the pixel electrode is electrically connected to the active device through the at least one opening.

10. The display of claim 1, further comprising an alignment layer arranged on the second substrate, the spacer being arranged between the alignment layer and the bump.

11. The display of claim 1, further comprising a black matrix arranged on the second substrate, the black matrix covering the spacer and the bump.

12. The display of claim 1, wherein the bump is overlapped with two adjacent pixel structures of the pixel structures.

13. The display of claim 1, wherein the bump is located at an intersection between one of the scan lines and one of the data lines.

14. The display of claim 1, wherein the spacer and the bump are completely overlapped.

15. The display of claim 1, wherein the spacer and the bump are partially overlapped.

16. The display of claim 15, wherein the spacer has the first shape, one of the two end sections of the first shape is overlapped with the bump, and the other end section of the first shape and the middle section of the first shape are not overlapped with the bump.

17. A display comprising:
a first substrate;
a plurality of scan lines, a plurality of data lines, a plurality of pixel structures, and a passivation layer all located on the first substrate;
a bump arranged on the first substrate;
a second substrate arranged opposite to the first substrate; and
a spacer arranged on the second substrate and at least partially overlapped with the bump, one of the bump and the spacer having a first shape and the other having a second shape, wherein each of lengths of two end sections of the first shape in a first direction is larger than a length of a middle section of the first shape in the first direction, wherein the spacer and the bump are partially overlapped, and the spacer has the first shape, one of the two end sections of the first shape is overlapped with the bump, and the other end section of the first shape and the middle section of the first shape are not overlapped with the bump.

* * * * *